(12) United States Patent
Gonsalves et al.

(10) Patent No.: US 8,965,788 B2
(45) Date of Patent: Feb. 24, 2015

(54) SEARCH PAGE TOPOLOGY

(75) Inventors: Michael F. Gonsalves, Minneapolis, MN (US); Gregory M. Nations, Minneapolis, MN (US); Chad R. Gourley, Elk River, MN (US); Troy Neidermire, Minneapolis, MN (US); Patricia Korth-McDonnell, Brooklyn, NY (US); Joe Stewart, Brooklyn, NY (US)

(73) Assignee: Target Brands, Inc., Minneapolis, MN (US)

( * ) Notice: Subject to any disclaimer, the term of this patent is extended or adjusted under 35 U.S.C. 154(b) by 260 days.

(21) Appl. No.: 13/177,444

(22) Filed: Jul. 6, 2011

(65) Prior Publication Data

US 2013/0013427 A1  Jan. 10, 2013

(51) Int. Cl.
- G06Q 30/00 (2012.01)
- G06F 17/30 (2006.01)
- G06Q 30/02 (2012.01)

(52) U.S. Cl.
CPC ...................................... *G06Q 30/02* (2013.01)
USPC ....................... 705/14.54; 705/14.73; 707/766

(58) Field of Classification Search
CPC ................................ G06Q 30/02; G06F 17/30
USPC ................. 705/14.54, 14.73; 707/E17.014, 707/E17.018, 766, 769, 999.003; 1/1
See application file for complete search history.

(56) References Cited

U.S. PATENT DOCUMENTS

| | | | |
|---|---|---|---|
| D109,791 S | 5/1938 | Sonin | |
| 5,423,139 A | 6/1995 | Feldman | |
| 5,644,735 A | 7/1997 | Luciw et al. | |
| 5,956,709 A | 9/1999 | Xue | |
| D415,483 S | 10/1999 | Decker | |
| 6,014,634 A | 1/2000 | Scroggie et al. | |
| 6,026,376 A | 2/2000 | Kenney | |
| 6,032,130 A | 2/2000 | Alloul et al. | |
| 6,055,573 A | 4/2000 | Gardenswartz et al. | |
| 6,141,666 A | 10/2000 | Tobin | |
| 6,182,871 B1 | 2/2001 | Lam | |
| 6,216,139 B1 | 4/2001 | Liston | |
| 6,298,330 B1 | 10/2001 | Gardenswartz et al. | |

(Continued)

FOREIGN PATENT DOCUMENTS

| | | |
|---|---|---|
| CA | 2714783 | 6/2011 |
| EP | 2015245 | 1/2009 |

(Continued)

OTHER PUBLICATIONS

Copy of Office Action from Canadian Patent Application No. 2,781,784, mailed Nov. 27, 2012 (4 pages).

(Continued)

*Primary Examiner* — Sun Li (74) *Attorney, Agent, or Firm* — Merek, Blackmon & Voorhees, LLC (57) ABSTRACT

In one embodiment, a search page portal can include two search controls capable of controlling content within a set of customizable merchandizing tiles and product tiles. The merchandizing tiles and product tiles may be interspersed throughout a central region. The merchandizing tiles and product tiles can be populated with webpage content based on user-entered data. In this example, populated webpage content can be selected from multiple databases based on user-entered data.

20 Claims, 5 Drawing Sheets

(56) References Cited

U.S. PATENT DOCUMENTS

| | | | |
|---|---|---|---|
| 6,542,927 B2 | 4/2003 | Rhoads | |
| 6,604,681 B1 | 8/2003 | Burke et al. | |
| 6,766,212 B1 | 7/2004 | Dean | |
| 6,965,376 B2 | 11/2005 | Tani et al. | |
| 7,002,573 B2 | 2/2006 | Trotta et al. | |
| 7,010,876 B1 | 3/2006 | Siegel et al. | |
| 7,055,130 B2 | 5/2006 | Charisius et al. | |
| 7,062,453 B1 | 6/2006 | Clarke | |
| 7,263,499 B2 | 8/2007 | Kunigita | |
| 7,284,206 B2 | 10/2007 | Ozawa et al. | |
| 7,409,362 B2 | 8/2008 | Calabria | |
| 7,503,502 B2 | 3/2009 | Montague | |
| D590,412 S | 4/2009 | Saft et al. | |
| 7,529,797 B2 | 5/2009 | Tseng et al. | |
| D599,373 S | 9/2009 | Kobayashi et al. | |
| 7,603,292 B1 | 10/2009 | Bragg et al. | |
| 7,613,687 B2 | 11/2009 | Nye | |
| 7,676,387 B2 | 3/2010 | Childress et al. | |
| 7,702,542 B2 | 4/2010 | Aslanian | |
| D619,613 S | 7/2010 | Dunn | |
| D622,280 S | 8/2010 | Tarara | |
| D625,323 S | 10/2010 | Matsushima et al. | |
| D626,133 S | 10/2010 | Murphy et al. | |
| 7,890,378 B2 | 2/2011 | Clarke et al. | |
| 7,996,282 B1 | 8/2011 | Scott et al. | |
| 8,001,003 B1 | 8/2011 | Robinson et al. | |
| D644,663 S | 9/2011 | Gardner et al. | |
| D656,950 S | 4/2012 | Shallcross et al. | |
| 8,244,590 B2 | 8/2012 | Rothman | |
| 8,250,145 B2 | 8/2012 | Zuckerberg et al. | |
| 2001/0029465 A1* | 10/2001 | Strisower | 705/14 |
| 2002/0046105 A1 | 4/2002 | Gardenswartz et al. | |
| 2002/0165799 A1 | 11/2002 | Jaffe et al. | |
| 2003/0014501 A1 | 1/2003 | Golding et al. | |
| 2003/0050848 A1 | 3/2003 | Defayette et al. | |
| 2005/0055321 A1 | 3/2005 | Fratkina et al. | |
| 2005/0081251 A1 | 4/2005 | Walker et al. | |
| 2005/0144093 A1 | 6/2005 | Kassan | |
| 2005/0147054 A1 | 7/2005 | Loo et al. | |
| 2005/0149269 A1 | 7/2005 | Thomas et al. | |
| 2006/0053066 A1 | 3/2006 | Sherr et al. | |
| 2006/0103130 A1 | 5/2006 | Koivukunnas et al. | |
| 2006/0277103 A1 | 12/2006 | Fujita et al. | |
| 2006/0277477 A1 | 12/2006 | Christenson | |
| 2007/0022020 A1 | 1/2007 | Bernstein | |
| 2007/0078850 A1 | 4/2007 | Aziz et al. | |
| 2007/0095615 A1 | 5/2007 | Spector | |
| 2007/0162850 A1 | 7/2007 | Adler et al. | |
| 2007/0192168 A1 | 8/2007 | Van Luchene | |
| 2007/0226189 A1 | 9/2007 | Piekos et al. | |
| 2007/0244883 A1 | 10/2007 | Bessieres et al. | |
| 2007/0244900 A1 | 10/2007 | Hopkins et al. | |
| 2007/0300261 A1 | 12/2007 | Barton et al. | |
| 2008/0005125 A1 | 1/2008 | Gaedeke | |
| 2008/0077487 A1 | 3/2008 | Davis et al. | |
| 2008/0097844 A1 | 4/2008 | Hsu et al. | |
| 2008/0147640 A1 | 6/2008 | Schachter | |
| 2008/0235085 A1 | 9/2008 | Kovinsky et al. | |
| 2008/0255962 A1 | 10/2008 | Chang et al. | |
| 2008/0270248 A1 | 10/2008 | Brill | |
| 2008/0270250 A1 | 10/2008 | Bolivar et al. | |
| 2009/0037355 A1 | 2/2009 | Brave et al. | |
| 2009/0106085 A1 | 4/2009 | Raimbeault | |
| 2009/0106113 A1 | 4/2009 | Arora et al. | |
| 2009/0132388 A1 | 5/2009 | Omori et al. | |
| 2009/0164315 A1 | 6/2009 | Rothman | |
| 2009/0164323 A1 | 6/2009 | Byrne | |
| 2009/0171812 A1 | 7/2009 | Fadell | |
| 2009/0173792 A1 | 7/2009 | Montague | |
| 2009/0199115 A1 | 8/2009 | Singh | |
| 2009/0265968 A1 | 10/2009 | McNamee | |
| 2009/0273612 A1 | 11/2009 | Xie | |
| 2009/0292599 A1 | 11/2009 | Rampell et al. | |
| 2009/0299965 A1 | 12/2009 | Aziz et al. | |
| 2009/0307100 A1 | 12/2009 | Nguyen et al. | |
| 2010/0114720 A1 | 5/2010 | Jones et al. | |
| 2010/0179876 A1 | 7/2010 | Holte | |
| 2010/0186066 A1 | 7/2010 | Pollard | |
| 2010/0223082 A1 | 9/2010 | Becker et al. | |
| 2011/0029368 A1 | 2/2011 | Hsu et al. | |
| 2011/0125569 A1 | 5/2011 | Yoshimura et al. | |
| 2011/0153451 A1* | 6/2011 | Bitz et al. | 705/26.7 |
| 2011/0173095 A1 | 7/2011 | Kassaei et al. | |
| 2011/0225152 A1 | 9/2011 | Beaudreau et al. | |
| 2011/0302498 A1 | 12/2011 | Gorodyansky | |
| 2012/0166945 A1 | 6/2012 | Roberts et al. | |

FOREIGN PATENT DOCUMENTS

| | | |
|---|---|---|
| WO | WO 00/79446 | 12/2000 |
| WO | WO 01/45020 | 6/2001 |
| WO | WO 01/84447 | 11/2001 |
| WO | WO 02/03268 | 1/2002 |
| WO | WO2005066844 | 7/2005 |
| WO | WO 2006/101348 | 9/2006 |
| WO | WO2007005431 | 1/2007 |

OTHER PUBLICATIONS

"Bedding & Bath," http://www.kohls.com/kohlsStore/bedandbath/towels/decorativetowels.jsp?bmForm=guided_nav-search&SubcatFolderID=2534374752660882, at least as early as Mar. 29, 2011 (2 pages).

"Processors-Desktops," http://www.newegg.com/Store/SubCategory.aspx?SubCategory=343&name=Processors-Desktops, at least as early as Dec. 30, 2010 (1 page).

"Kitchen & Dining," http://www.amazon.com/kitchen-dining-small-appliances-cookware/b/?ie=UTF8&node=284507, at least as early as Jan. 28, 2011 (3 pages).

Google Product search results for "Canon Powershot", Retrieved Mar. 5, 2010 from the Internet at: http://www.google.com/products?q=canon+powershot&aq=0&oq=canon+p, 3 pages.

Tom's Hardware Home Page, Tom's Hardware: Hardware News, Tests and Reviews, Retrieved Mar. 4, 2010 from the Internet at:: http://www.tomshardware.com/us/#redirect, 3 pages.

BestBuy, Search Results for "i7", Retrieved Aug. 5, 2011 from the Internet at: http://www.bestbuy.com/site/olspage.jsp;jsessionid=9B6687FFBB3C82, 8 pages.

Kohls, Search Results for "bath towel", Retrieved Aug. 5, 2011 from the Internet at: http://www.kohls.com/upgrade/webstore/home.jsp;jsessionid=2W1QT8, 3 pages.

HP Support, Search Results for "HP Pavilion dv7t-1000" / FAQ, Retrieved Mar. 25, 2010 from the Internet at: http://h10061.www1.hp.com/ccsearch/search?pname=HP+Pavilion+dv7t-1000+CTO+Ent, 1 page.

Amazon, Prime Eligible Under $25, [Online], Dec. 19, 2009, Retrieved from the Internet at: http:l/www.amazon.com/s/Znode=2238906011 &field%2dprice=%2d2500&p%5f76=1, 4 pages.

Amazon, Recommended for You, [Online], Dec. 21, 2009, Retrieved from the Internet at https:l/www.amazon.com/gp/yourstore?ie=UTF8&ref_pd%5Firi%5Fgw, 3 pages.

Amazon, search Results for Columbia 100% cotton Towels, Retrieved Aug. 10, 2011 from the Internet at: http://www.amazon.com/gp/search/ref=sr_nr_scat_1 0789941_1n?rh=n%3A 10789941 %2Ck%3Acotton+bath+towels &keywords=cotton+bath+towels&ie=UTF8&qid=1312572186 &scn=1 0789941&h=5ec5aedf63cc88f6e48fda6b27c85681 ae 7a21 ba, 6 pages.

Amazon.com Universal Wish List, [Online]. Dec. 20, 2010, Retrieved from the Internet at: http://www.amazon.com/b/?ie=UTF8 &node=2223317011 &tag=googhydr-20&hvadid=3877744091 &ref=pd_sl_37ck7ovrfc_b, 3 pages.

Best Buy, Every Day Laptops, [Online], Dec. 13, 2009, Retrieved from the Internet at: http://www.bestbuy.com/site/Laptop-Computers/Everyday-Laptops, 4 pages.

Canon Digital Rebel XT Review (www.dcviews.com, Jul. 4, 2007, 5 pages.

(56) References Cited

OTHER PUBLICATIONS

Office Action from Canadian Patent Application No. 2.761 ,936, mailed Jul. 16, 2012 (3 pages).
Office Action from Canadian Patent Application No. 2.761 ,936, mailed Nov. 21, 2012 (3 pages).
Office Action from Canadian Patent Application No. 2.761 ,936, mailed Apr. 18, 2013 (3 pages).
Office Action from Canadian Patent Application No. 2.761 ,560, mailed Apr. 18, 2013 (3 pages).
Eddie Bauer.com,, [Online] Dec. 20, 2010, Retrieved from the Internet at: https://www.eddiebauer.com/checkout/bag.jsp?&categoryId=95&categoryName=SWEATERS--CARDIGANS&pCategoryId=3&pCategoryName=WOMEN&gpCategoryId=1&gpCategoryName=EB#ppl=%7Btype%3A%22transition%22%2CensembleId%3A%2236211%22%2CformatStr%3A%22product%22%2CpassedId0bj%3A%7B%22ensembleId%22%3A%2236211%22%7D%2CcategoryId%3A%2227411%22%2CpathInfo%3A%22undefined.
Etihad Airways Home Page, Retrieved Aug. 10, 3011 from the Internet at: http://www.etihadairways.com/sites/etihad/us/en/home/pages/home.aspx?cid=ppc _start, 1 page.
Facebook Adds Profile Preview Feature [Online], Jan. 7, 2010, Retrieved from the Internet at: http://www.allfacebook. com/facebook-adds-profile-preview- feature-2008-09, 5 pages.
Facebook Developers Facebook Connect, Build and grow with Facebook Connect, [Online] Dec. 18, 2009, Retrieved from the Internet at: http://developers.facebook.com/connecl.php, 2 pages.
Gardella, Greg H., Letter to Robert T. Maldonado, Re: Huge Inventors for Target Brands, Inc. Patent Applications, Apr. 11, 2011, 5 pages.
Grannell, Craig, .net/techniques, /CSS/create a navigation bar, Sep. 2, 2007, 4 pages.
Han, Taedong, Exploring Price and Product Information Search Behavior in e-Market, Proceedings of the International Conference on Information Technology: Coding and Computer, Mar. 2005, 6 pages.
Huge, Target Patents, Target Patent Annotations, PowerPoint Slides, Mar. 28, 2011, 35 pages.
Just-Style: connecting to consumers, [Online], Sep. 16, 2002, Retrieved from the Internet at: http://www.just-style.com/articleprinl.aspx?id=93012 on Dec. 19, 2009,4 pages.
Kohls [Online], Dec. 20, 2010, Retrieved from the Internet at: http://www.kohls.com/upgrade/webstore/home.jsp;jsessionid=3cSgNPpTqV8tRh32vBzDf2q 12xQJzpWQjD5Mpnrq1p3wtMX81Psn!-1748685949! 105707934, 2 pages.
Lin, Wen-Shan et al., Understanding Consumer Search Activity and Online Purchase Intensions for Improving the Product Recommendation Search, 6th IEEE/ACIS International Conference on Computer and Information Science, D, Apr. 2007, 6 pages.
Logictech Mouse Home Page, Retrieved Aug. 10, 2011 from the Internet at: http://www.logitech.com/en-us/mice-pointers/mice, 13 pages.
Maldonado, Robert T., Letter to Gardella, Greg H., Re: Inventor Declarations from Huge Inventors, Mar. 31, 2011, 2 pages.
Muspy, Artists [Online], Jan. 7, 2010, Retrieved from the Internet at: http://www.muspy.com/artists, 2 pages.
Online Pharmacy for Prescription Drugs- CVS Pharmacy Drug Store [Online], Dec. 21, 2009, Retrieved from the Internet at:http://www.cvs.com/CVSApp/user/home/home.jsp, 2 pages.
Organize.com, Kitchen, [Online], Dec. 20, 2009, Retrieved from the Internet at: http://www.organize.com/kitchen.html, 4 pages.
OfficeMax, Laptop Notebook Computers: New Laptop Computers, Wireless Laptop Computers, [Online], Dec. 13, 2009, Retrieved from the Internet at: http://www.officemax.com/technology/computers/laptop-computers, 3 pages.
Pet, CSN Stores, [Online], Dec. 20, 2009, Retrieved from the Internet at http://www.csnstores.com/Pet-C216358.html, 2 pages.
"Priceless Promotions," by Samantha Murphy, Chain Store Age 84. 10 (Oct 2008): 58.
Sam's Club, [Online], Dec. 21, 2009, Retrieved from the Internet at: http://www.samsclub.com/shopping/index.jsp, 3 pages.
Sony Notebook Home Page, Retrieved Aug. 10, 2011 from the Internet at: http://store.sony.com/webapp/wcs/stores/servlet!CategoryDisplay?catalogId= 1 0551 &storeId= 1 0151 &langId=-1 &categoryId= 16154&SR=nav: electronics:computers:laptops:shop_compare:ss&ref=http%3A%2F%2Fwww.sony.com%2Findex.php, 5 pages.
Sonystyle, [Online], Dec. 13, 2009, Retrieved from the Internet at: http://www.sonystyle.com/webapp/wcs/stores/servlet/StoreCatalogDisplay?langId=- 1&storeId=10151 &catalogId=10551&eid=372683003, 2 pages.
Walmart, [Online], Dec. 21, 2009, Retrieved from the Internet at: http://www.walmart.com, 2 pages.
Yahoo! Small Business, Effective Navigation Bar Design, [Online], Dec. 21, 2009, Retrieved from the Internet at: http://sma llbusiness.yahoo .com/r- pfp-a- 40931-m-6-sc-37 -effective _navigation_ b ar _design .html, 1 page.
Jan. 28, 2013 Office Action, U.S. Appl. No. 12/973,651.
Mar. 18, 2013 Office Action, U.S. Appl. No. 12/887,098.
BabiesRus, Baby Gifts—Baby Registry at BabiesRus, [Online], Dec. 20, 2010, Retrieved from the Internet at: http://www.toysrus.com/registry/index.jsp, 1 page.
Crate&Barrel, [Online], Dec. 20, 2010, Retrieved from the Internet at: http://www.crateandbarrel.com/gift-registry/, 1 page.
Amazon.com, [Online], Dec. 20, 2010, Retrieved from the Internet at: http://www.amazon.com/gp/wedding/homepage/ref=sv_cm_gft_5, 1 page.
Macy's, [Online], Dec. 20, 2010, Retrieved from the Internet at: http://macys.com/registry/wedding/registryhome, 1 page.
http://www.target.com, Target Brands, Inc., Archived on Jul. 14, 2009, retrieved from web.archive.org/web/20090714060557/http://www.target.com, pp. 1-84.
Kalbach, Designing Web Navigation, O'Reily Media, Aug. 2007, pp. 73-74; p. 90.
Meloni, Sams Teach Yourself HTML and CSS in 24 Hours, 8th ed., Sams Publishing, Dec. 2009, p. 361.
Van Duyne et al., The Design of Sites: Patterns for Creating Winning Web Sites, 2nd ed., Prentice Hall, 14, Dec. 2006, pp. 677-758.
Cohen, The Unusually Useful Web Book, New Riders Publishing, Jun. 2003, pp. 113-114.
Poem entitled "i carry your heart with me (i carry it in," by E.E. Cummings [On-line], Poem dated 1920. Retrieved from Internet 06-03-2-13. URL:>http://en.wikipedia.org/wiki/E._E._Cummings<. . (12 pages, see p. 5).
Office Action from Canadian Patent Application No. 145,725 mailed Oct. 1, 2012 (1 page).
Steve Eastman Presentation, Target Managers Meeting, Mar. 15, 2010.
TGT—Target Financial Community Meeting, Jan. 21, 2010.
Office Action from Canadian Patent Application No. 2,781,784, mailed Jul. 26, 2013 (7 pages).
Canadian Office Action dated Nov. 17, 2014 issued in connection with Canadian Patent Application No. 2,781,784, pp. 1 to 8.
Kohls.com website; http://web.archive.org/web/20110329114442/http://www.kohls.com/kohlsStore/bedandbath/towels/decorativetowels.jsp?bmForm=guided_nav_search&SubcatFolderlD=2534374752660882, Mar. 29, 2011.
Newegg.com website; http://web.archive.Org/web/20101230072727/http://www.newegg.com/Store/SubCategory.aspx?SubCategory=343&name=Processors Desktops, Dec. 30, 2010.
Amazon.com website:http://web.archive.org/web/20110128113141/http://www.amazon.com/kitchen dining small appliances cookware/b?ie=UTF8&node=284507, Jan. 28, 2011.

\* cited by examiner

SEARCH PAGE TOPOLOGY

BACKGROUND

Users employ web browsers to view webpages on the Internet while searching for information. Search engines allow such users to easily find information by providing search controls capable of receiving keywords from the users. Some search engines provide links to webpages for a specific web site and others provide links to multiple web sites. For instance, the user searches for information using a search engine provided by a specific website.

Search results are typically presented in a list and are often referred to as search hits. The information in search hits may include web pages, images, text information, and files. Some search engines also mine data available in databases or open directories. Unlike web directories, which are maintained by human editors, search engines operate algorithmically or are a mixture of algorithmic and human input.

Information pertaining to products and or services can be found using search engines. For example, a user can search for particular websites relating to products or services in order to find out more about those products or services. In some examples, the user may search for and view buying guides and/or reviews about the products or services.

A user can purchase the products or services over the Internet from an e-commerce site. E-commerce websites use servers to store webpages. In general, a server receives a request for a webpage from a user and provides the webpage or information relating to the webpage to the user. The server can store user account information to provide improved service to the user. Upon completion of a purchase, a particular e-commerce website may ship products to customers. In some implementations, e-commerce websites allow a user to purchase a product and pick up the product at a retail store.

SUMMARY

In one embodiment, a search page portal can include two search controls capable of controlling content within a set of customizable merchandizing tiles and product tiles. The merchandizing tiles and product tiles may be interspersed throughout a central region. The merchandizing tiles and product tiles can be populated with webpage content based on user-entered data. In this example, populated webpage content can be selected from multiple databases based on user-entered data.

A first search control may narrow a set of search results to particular search results and may populate a central region of a webpage with content pertaining to the search results. A second search control may be invoked to repopulate the central region of the webpage with content related to text articles pertaining to the search results.

In one embodiment, the search controls may be employed to repopulate a central region of a webpage or another region of the webpage with advertisements. In one embodiment, the search controls may be employed to repopulate the central region of the webpage or another region of the webpage with information about frequently asked questions (FAQs), buying guides, publications, and/or physical store locations.

The details of one or more implementations are set forth in the accompanying drawing and description below. Other features, objects, and advantages will be apparent from the description and drawings, and from the claims.

DESCRIPTION OF DRAWINGS

Like reference symbols in various drawings indicate like elements.

DETAILED DESCRIPTION OF ILLUSTRATIVE IMPLEMENTATIONS

Figure 1:
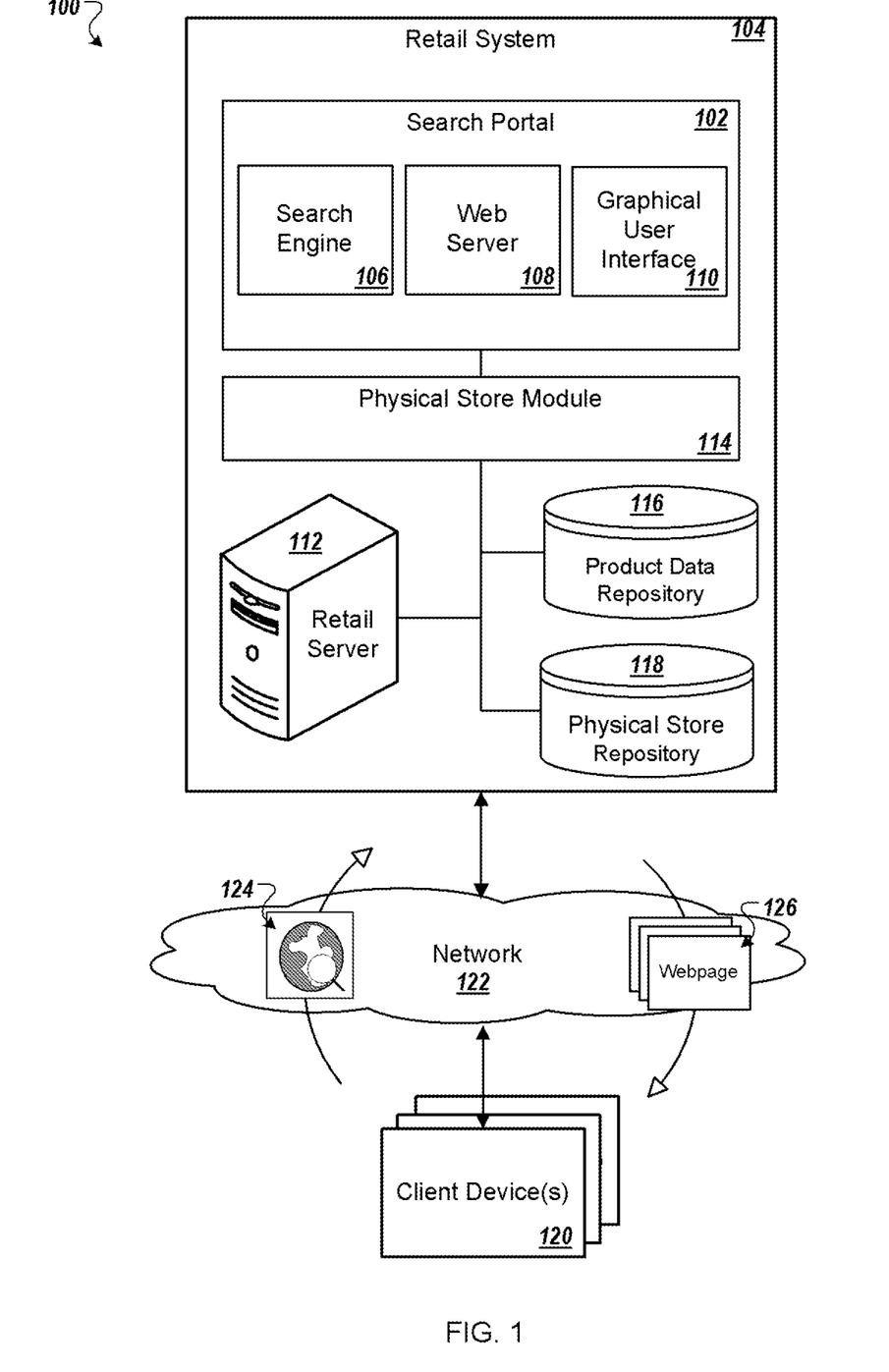
FIG. 1 illustrates an example environment for serving a search portal.

FIG. 1 illustrates an example environment 100 for serving a search portal 102 in a retail system 104. At a high level, the environment 100 provides users search results in a webpage format. For example, the environment 100 generates webpages from a server and the server provides a page or code to generate search result content for display on a client device 120. The client device 120 is generally connected to a display device (not shown) which presents the search result content in a webpage.

The search portal 102 provides a point of access for the user to conduct searches and receive search results. In some implementations, the search portal 102 serves as an intermediary between a retail server 112 and the client device 120 during a search operation. For example, the client device 120 inputs the query 124 at the search portal 102. The search result webpage 126 generated by the retail server 112 is sent to the search portal 102, which is relayed to the client device 120 via the network 122.

As shown in FIG. 1, the retail system 104 includes a physical store module 114 that is accessible to a client device 120 via the network 122. In operation of environment 100, the client device 120 requests webpages from a web server 108 for presentation to the user. In particular, the client device 120 receives input from the user directing the client device 120 to a specific e-commerce web site. For example, a browser in the client device 120 receives a Uniform Resource Locator (URL) address from the user and displays to the user content of the specific e-commerce located at the URL address. In some implementations, the client device 120 receives a search query 124 from a user and sends the query 124 to the web server 108. The query 124 can be related to products or services offered by the e-commerce company, for example. The query 124 generally includes information such as product keywords, store information, product articles or ratings, and product pricing. The web server 108 relays the query 124 to the search engine 106 and a retail server 112. The search engine 106 processes the query 124 and identifies product results related to the search query. The search engine 106 identifies and retrieves product results located in a product data repository 116, a physical store repository 118, or another repository. Upon retrieving product results, the retail server 112 creates a search results webpage 126 and provides the search results webpage 126 to the web server 108. The web server 108 then relays the search results webpage 126 to the client device 120. The browser of the client device 120 displays the search results webpage 126 to the user. In an alternative embodiment, the retail server 112 directly receives the query 124 and sends the search results webpage to the client 120.

The search portal 102 includes a search engine 106, a web server 108, and a graphical user interface 110. The search engine 106 functions to receive the query 124 generated by the user, match the search query 124 to information stored in the repositories 116, 118, and produce a search result. In operation, the search engine 106 generates matched search results based on the query 124 provided by the user. In some implementations, the query 124 includes product description, product availability, pricing, and product review information. In some implementations, the search engine 106 accesses additional repositories (not shown) to identify results related to the query 124. For example, the search engine 106 may provide search result content from web sites outside of the retail system 104.

The web server 108 hosts one or more websites of the retail system 104. In some implementations, the web server 108 manages the information exchanged between the client device 120 and the retail system 104. For example, the web server 108 sends digital information to the client device 120 such that a user of the client device 120 can properly view search result webpage 126 generated by the retail server 112. In addition, the web server 108 parses search requests and feedback generated from the client device 120. In some implementations, the web server 108 relays the requests to the physical store module 114 and/or the search engine 106. In various implementations, the web server 108 identifies an Internet Protocol (IP) address of the client device 120, and stores a cookie on the client device 120 for future identification purposes. Information stored in the cookie may be associated with the user operating the client device. In some implementations, the cookie includes user information such as user authentication data, browsing session data, and/or shopping cart content.

The graphical user interface 110 provides a medium for the user to interact with the search portal 102 through one or more webpages. The graphical user interface 110 displays images, audio, and text onto the webpages for the user to view. For example, the graphical user interface 110 executes a preview of a movie on the client device 120 so the user is able to review audiovisual content prior to purchasing the movie.

In some implementations, the graphical user interface 110 includes radio buttons, links, indicators, and text boxes for the user to input information for searches and other functions. While browsing webpages in an e-commerce site, the client device 120 may provide input to the web server 108 via the graphical user interface 110 to request for additional webpages for viewing. For example, a user using client device 20 can enter input using a keyboard, mouse, or other input device. Example graphical user interfaces are described below with respect to FIG. 2 and FIG. 3.

The retail server 112 generates a search results webpage 126 using query 124 and provides the webpage 126 to the client device 120. The browser of the client device 120 displays the search results webpage 126 to the user. In some implementations, the retail server 112 stores information relating to webpages. The server 112 can store information pertaining to products or services offered by the e-commerce company. For example, the server 112 stores information about buying guides, reviews, articles, and/or frequently asked questions.

The retail system 104 additionally includes the physical store module 114 configured to provide information about physical store data. The physical store data pertains to in-store transactions performed by particular users. Physical store data can be linked to a number of selectable areas within graphical user interface 110.

The product data repository 116 includes information on products and services available to view and/or purchase online. Examples of information stored in repository 116 include product prices, customer reviews and feedback, product availability, and general information such as product physical descriptions.

The physical store repository 118 includes information on products available in the bricks-and-mortar stores. Examples of the information stored in the physical store repository 118 include product inventory and availability for particular physical store locations. In certain embodiments, the product data repository 116 and the physical store repository 118 are combined as a single repository within the retail system 104. In some implementations, the product data repository 116 and the physical store repository 118 each include more than one data repository on available across multiple servers.

Figure 2:
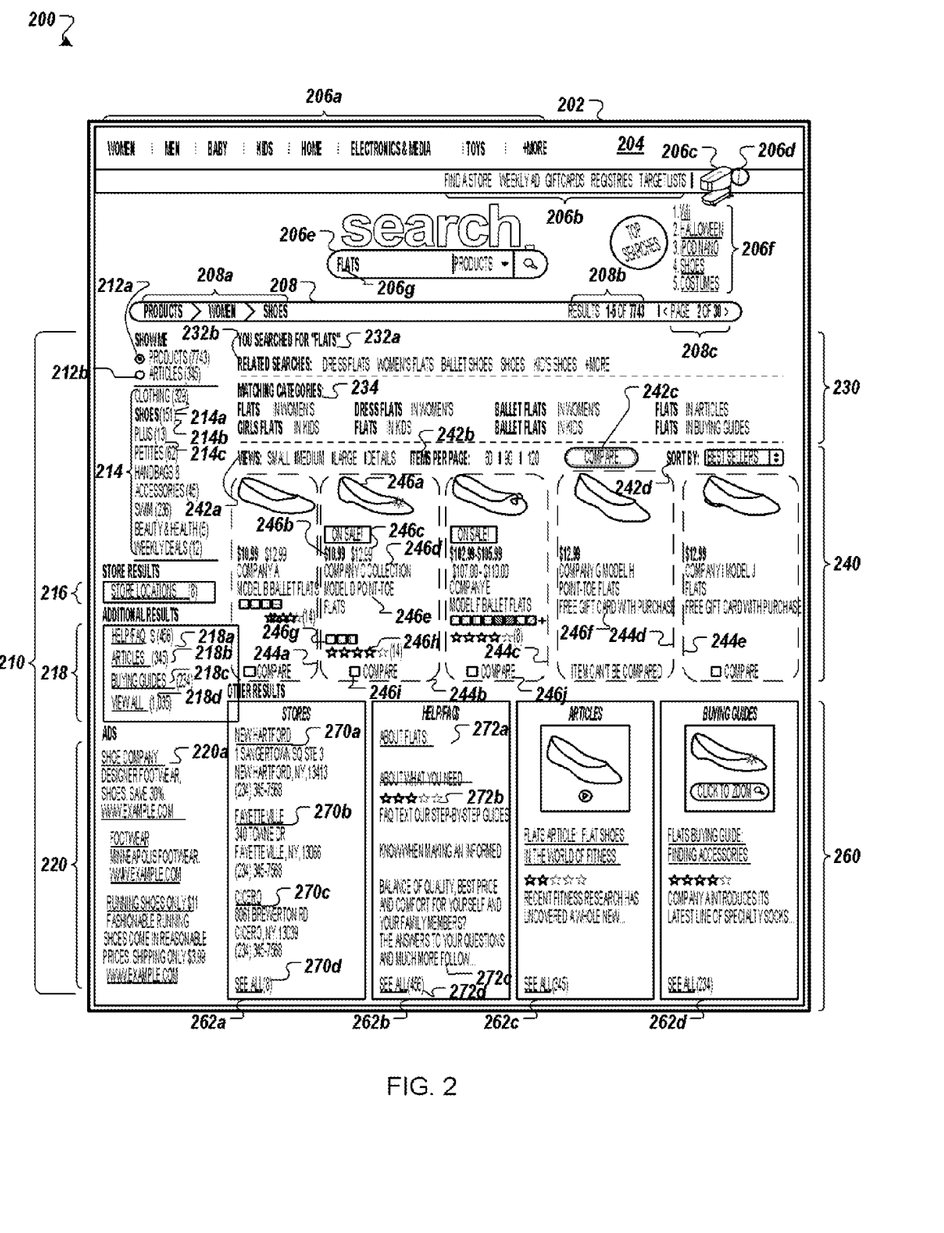
FIG. 2 is an example screenshot of a webpage in a search portal.

FIG. 2 is an example screenshot of a webpage 200 in the search portal 102. Briefly, the webpage 200 provides an interactive environment for searching for products and/or services offered by an e-commerce company. A user inputs a search string via the webpage 200 to find or view a number of products. The webpage 200 shows the results returned by the retail system 104. The webpage 200 includes information on the pricing and description of the products. Additionally, the webpage 200 provides information that may assist the user in making an informed purchasing decision.

The webpage 200 represents an example of an online retail interface for searching, viewing, and purchasing products and services. In some implementations, the webpage 200 includes interactive controls and inputs for users to manipulate the contents on the webpage 200. For example, the webpage 200 can include selection controls to allow the user to browse the results based on one or more criterion. The webpage 200 contains a number of navigational links to webpages displaying products that may be of interest to the user.

As shown in FIG. 2, the webpage 200 is displayed in a window 202 of a display screen (e.g., a computer monitor, a smartphone display, a television, etc.). The webpage 200 is laid out to be approximately the width of the window 202 and extends vertically in a scrollable manner. In various implementations, the aspect ratio (height to width) of the webpage 200 is substantially greater than 1:1. In the example of FIG. 2, the aspect ratio is about 2:1 or 3:1. In other embodiments, the aspect ratio is about 1:1 to about 10:1, and more preferably about 2:1 to about 5:1. In some implementations, the webpage 200 is resized to cover a portion of the display screen.

The webpage 200 includes a page header 204 substantially spanning the width of the webpage 200. The page header 204 includes a first number of menu items 206*a* that are selectable by a user. The menu items 206*a* are links allowing the user to navigate to different product categories including, but not limited the following categories: WOMEN, MEN, BABY, KIDS, HOME, ELECTRONICS, TOYS, etc. The page header 204 also includes a second grouping of menu items 206*b* including selectable links pertaining to products. In particular, the menu items 206*b* include FIND A STORE, WEEKLY AD, GIFTCARDS, REGISTRIES, etc. Other links can be shown in menus 206*a* and 206*b*.

The user selects one or more menu items 206*a*-*b* to navigate to other webpages (not shown) or to activate the display of sub-menu items. In some implementations, menu items 206*a*-*b* include links to webpages belonging to the e-commerce company hosting the webpage 200. In other implementations, the webpages linked to the menu items 206*a*-*b* are hosted by one or more companies.

A shopping cart indicator 206*c* is selected by the user to display a list of items the user has selected for purchase. As shown, a quantity indicator 206*d* is superimposed on the shopping cart indicator 206*c* to display the quantity of items that the user has selected for purchase (e.g., how many items are in the user's virtual shopping cart). In some implementations, the quantity indicator 206d is displayed only when the user has selected one or more items for purchase (e.g., displayed only when the virtual shopping bag contains items). In some implementations, the quantity indicator 206d is displayed when the user places a cursor (not shown) over the shopping cart indicator 206c (e.g., upon a mouseover action).

A search input box 206e and a common search performed list 206f are disposed underneath the page header 204. The search input box 206e is provided for the user to enter search input 206g. For example, the user could type in keywords associated with a product (e.g., "flats", "broom", "skateboards") to activate a search routine that assists the user in finding products pertaining to the entered keywords. The top search list 206f includes the most popular search keywords entered by the visitors of the webpage 200.

A quick summary bar 208 is disposed approximately beneath the search input box 206e and the top search list 206f. The quick summary bar 214 lists an organization hierarchy 208a of the product searched by the user, a number of results 208b, and a number of pages 208c displaying the results. In the example webpage 200 shown in FIG. 2, by searching for the string "flats," the quick summary bar 208 displays the organization hierarchy 208a of the result. The "flats" category is organized under the "shoes" category, which in turn is organized under the "women" category, which in turn is organized under the "products" category. In some implementations, displaying the organization hierarchy 208a of the search result allows the user to navigate back to a previous category during browsing.

The quick summary bar 208 shows the number of results 208b, which is shown to be 7743 products, that are identified to match the search input 206g. Providing the number of results 208b to the user enables the user to decide on narrowing or broadening the search. For example, if the user determines the number of results 208b to be too large for browsing, the user can decide to narrow the search to reduce the number of results 208b to a more manageable level. Alternatively, the user may wish to broaden the search to include more results.

The webpage 200 includes a search control bar 210. The search control bar 210 includes a first control 212a, a second control 212b, a product category control 214, a store results control 216, an additional results control 218, and an ads control 220. The controls present the user selectable options to narrow down the search results or filter the contents displayed on the webpage.

Each of the first and second control 212a, 212b represents a category of search results available for the user to view. In some implementations, the user is able to view the matched products from the search results by selecting the first control 212a. The webpage 200 shown in FIG. 2 illustrates an example of the user selecting the first control 212a for the search page. In another implementation, the user selects the second control 212b to view the articles related to the search results, which will be discussed in more detail later. Additional controls are possible.

In the exemplary embodiment shown in FIG. 2, entering the search input 206g "flats" into the search input box 206e results in 7743 products and 345 articles. The user can optionally select the first control 212a to view the products or the second control 212b to view the articles.

The webpage 200 also includes a product category control 214 located below the first and second controls 212a-b. As illustrated, a product category control 214 presents the user with selectable options for narrowing the search results by choosing a product category, such as a clothing category 214a, a shoes category 214b, a plus category 214c, etc. In the example webpage 200 shown in FIG. 2, the user selects the shoes category 214b to view 151 products found under the shoes category 214b after the search input 206g "flats" is entered into the search input box 206e. By selecting the shoes category 214b, the webpage 200 displays products found in the shoes category 214b that also match to the search input 206g "flats" within the e-commerce store. Products that are matched to the search input 206g but not in the shoes category 214b are temporarily hidden from the user. If the user decides to view products in another product category, he or she can reversibly select another category in the product category control 214.

In some implementations, a product is organized under more than one product category. For example, an x-large sized t-shirt may belong to both the clothing category 214a and the plus category 214c. In some implementations, the product category control 214 shows a portion of the product categories found during the search. In some implementations, the portion of the product categories shown represents the most popular products categories.

A store results control 216 is shown below the product category control 214. In some implementations, the store results control 216 provides the user with a selectable option for displaying the physical stores proximate to the user's geographical location.

In some implementations, the user enters his or her geographical location when creating an account. When the user logs in and performs the search, the retail server 112 locates the stores closest to the location provided by the user and includes the store information into the webpage 200. In certain implementations, the retail server 112 generates the physical store information based on the information provided by the internet service provider (ISP) of the user. In yet other implementations, the user specifies a geographical location of interest and the retail server 112 provides the physical store information near the location of interest. This location of interest may be different from the user's geographical location.

An additional results control 218 is positioned below the store results control 216. The additional results control 218 provides additional resources to present the user with information that may assist the user in making an informed decision. In the exemplary embodiment shown in FIG. 2, the additional results control 218 includes a help/Frequently Asked Questions (FAQS) control 218a, an articles control 218b, a buying guides control 218c, and a view all control 218d.

In some implementations, the user optionally selects the control 218a to access resources such as receiving input from a team member, viewing a list of frequently asked questions and answers regarding the searched product, and reading a product handling and care instruction. The selection of the help/FAQS control 218a may generate other resources available to the user.

In some implementations, the user optionally selects the articles control 218b to view available articles regarding the searched product. Examples of the available articles include operational manuals for products, safety information, and reviews written by other guests.

In some implementations, the user optionally selects the buying guides control 218c to view appropriate buying guides for searched products. By selecting the buying guides control 218c, the user is able to view publications providing advice from consumers or experts to assist with selecting a product.

The ads control 220 displays a list of advertisements that may be of interest to the user. The products and services advertised may be related to the search input 206g provided by the user. In various implementations, a first advertisement 220a includes a name of the company providing the first advertisement, the description of the advertised product or service, and a hyperlink to the website of the advertised product or service. In some implementations, the advertisements presented in the ads control 220 include products provided by collaborative vendors of the e-commerce company.

A related search region 230 is shown below the quick summary bar 208. The top of the related search region 230 includes a search string display 232a, which shows the search input 206g the user entered into the search input box 206e above. The bottom of the related search region 230 includes a related search list 232b that provides a list of keywords (e.g., dress flats, women's flats, ballet shoes) that are related to the search input 206g. In some implementations, the related search list 232b provides alternative search inputs that help the user select the appropriate products.

A suggested search target region 234 is located beneath the related search region 230. The suggested search target region 234 includes recommended categories (e.g., flats in women's, girls flats in kids, dress flats in women's) for the user to select. Here, the environment 100 selected categories that align with the user's entered search term of "flats." Thus, other shoe related categories are displayed to the user in the related search region 230. Each item in the related search region 230 may include a selectable link to another webpage pertaining to each item. In some implementations, a suggested search target region is displayed to the user to provide further information related to the user entered search term.

A central region 240 of the webpage 200 includes an array of customizable merchandising and/or product tiles 244a-e. Each merchandising and/or product tile 244a-e is customizable and can be updated upon receiving user input. For example, the tiles 244a-e are customizable by a retail enterprise serving a webpage. The customized tiles are capable of displaying advertisements or products available for purchase via the webpage. In some implementations, the merchandizing tiles and product tiles 244a-e are interspersed in the central region 240. Each tile 244a-e provides a separate instance of a software service.

As shown in FIG. 2, the central region 240 of the webpage 200 includes a view selector 242a, an items-per-page selector 242b, a compare control 242c, a sorting control 242d, and a number of merchandizing tiles 244a-e. The view selector 242a enables the user to select the size of the merchandizing tiles 244a-e displayed (e.g., small, medium, large, details). In some implementations, the user selects small size merchandizing tiles 244a-e to view a large number of products. Alternatively, the user selects large tiles 244a-e to view fewer products per page, yet each product image shows a greater graphical detail. The detail view shows an itemized listing of the products along with textual descriptions.

In some implementations, the user chooses the number of products shown on each page using the items per page selector 242b. In the example webpage 200 shown in FIG. 2, the items per page selector 242b offers the user the options of displaying 60, 90, and 120 items per page.

The compare control 242c enables the user to compare two or more products on the webpage. By selecting two or more products displayed in the merchandizing tiles 244a-e, the user is able to activate the compare control 242c to perform a side-by-side comparison of the selected products in a tabular view. In some implementations, the side-by-side comparison includes the price, availability, ratings, and sales information of the selected products. Other parameters of the products can be included.

The sorting control 242d sorts the search results by metrics such as BEST SELLERS, LOWEST PRICE, HIGHEST PRICE, HIGHEST RATED, for example. By selecting various ones of the metrics of the sorting control 242d, the user is able to alter the order in which items appear in the merchandizing tiles 244a-e (e.g., ranked by popularity, priced low to high, priced high to low, rated by users).

The central region 240 includes a number of merchandizing tiles 244a-e to display products related to the search strings 210a. The merchandizing tiles 244a-e substantially span the width of the central region 240. In some implementations, the merchandizing tile 244b includes a product image 246a, a current price 246b, a previous price 246c, a brand name 246d, a product name 246e, a product note 246f, a style indicator 246g, a rating bar 246h, and a compare control box 246i.

The central region 240 depicts webpage content that includes data objects corresponding to product information. The product information generally corresponds to user entered search query data. In some implementations, the central region 240 depicts webpage content that includes data objects corresponding to text articles pertaining to particular search query data.

In some implementations, the product image 246a shows a perspective view of the product offered in the merchandizing tile 244b. The size of the product image 246a can be adjusted by the view selector 242a in the central region 240. In certain implementations, the product image 246a is unavailable for viewing.

In some implementations, the merchandizing tile 244b shows the current price 246b and the previous price 246c. The current price 246b indicates the presence of an on-going sale. The previous price 246c represents the price prior to the sale. In various implementations, the merchandizing tiles 244a-e show only the current price 246b. In some implementations, the current price 246b and the previous price 246c show a price range.

The brand name 246d indicates the name of the brand of the product shown in the product image 246a. In certain implementations, the brand name 246d includes collaborative vendors of the e-commerce company. In some implementations, the brand name 246d is the name of the e-commerce company. The product name 246e shows the name of the product in the merchandizing tile 244b.

In some implementations, the product note 246f shows a message (i.e. free gift card with purchase) associated with the product shown in the merchandizing tile 244b. The product note 246f is optionally omitted in some merchandizing tiles 244a-e. In some implementations, the product note 246f includes promotional messages the e-commerce company wants to broadcast to the user (e.g., reward program, sales information, free shipping).

In some implementations, the style indicator 246g shows the available colors, patterns, designs, and decorations associated with the product shown in the merchandizing tile 244b. In some implementations, the style indicator 246f includes the most popular styles of the product in the merchandizing tile 244b.

In some implementations, selecting a specific style offered by the style indicator 246g changes the product image 246a to reflect the selected style. For example, if the product image 246a shows a pair of green flats, selecting a red style in the style indicator 246g changes the product image 246a to show a pair of red flats. In various implementations, the style indicator 246g includes a number of styles available for the product, with a portion of the styles hidden until the user selects to expand all the styles.

In some implementations, the rating bar 246h shows the average rating given by buyers willing to contribute to the rating and review. For example, when a customer chooses to leave a comment and rating for the selected product, other shoppers see the customer's image, comment, and rating when looking at the same selected product. The rating bar 246h includes a maximum of five available stars. A product receives one star if buyers are the least satisfied with the product, and five stars if buyers are the most satisfied. The rating bar 246h shows a rating of three stars for the product shown in the merchandizing tile 244b. In some implementations, the rating bar 246h is able to present a partial star to indicate a fractional rating (e.g., a half or a quarter star). In certain implementations, the rating bar 246h includes a numbered rating in a parenthesis that represents a number of buyers providing the numbered rating to the rating bar 246h. The rating bar 246h is optionally omitted if the product does not receive any ratings from buyers, in one example.

In some implementations, the merchandizing tile 244b includes the compare control 246i. By selecting the compare control 246i, the user is able to perform a side-by-side comparison of the product in the merchandizing tile 244b with another product. For example, the user selects the compare control 246i and a compare control 246j to compare the products in the second and third merchandizing tiles 244b, 244c, respectively. In some implementations, the side-by-side comparison includes comparing features such as product price, available styles, sales, and reward information. Other features are possible.

A generally horizontal region 260 is shown positioned beneath the merchandizing tiles 244a-e. The region 260 can include two or more tiled sub-regions. As shown in FIG. 2, example sub-regions include a store information tile 262a, a help/FAQ information tile 262b, an article information tile 262c, and a buying guide information tile 262d. The tiles 262a-d are disposed substantially close to and beneath the merchandizing tiles. The information tiles 262a-d substantially span the width of the region 260. The information tiles 262a-d each has an aspect ratio substantially greater than 1:1. In the example webpage 200 shown in FIG. 2, the aspect ratio of each tile is about 2:1 or 4:1. In other embodiments, the aspect ratio is about 1:1 to about 10:1, and more preferably about 2:1 to about 5:1, and in certain implementations, about 3:1.

In some implementations, the store information tile 262a includes location information 270a-c pertaining to the nearest physical store with respect to the geographical location of the user. For example, the store information tile 262a displays the store information 270a-c of the three nearest stores, including the phone numbers and physical addresses. The user can optionally elect to view all available contact information of the matched stores by selecting a control 270d.

In some implementations, the store information 270a-c is determined based on the user's input regarding a residence address. Specifically, the user may create a user account with the e-commerce company. The user account includes information regarding the geographical location of the user. When the user logs into the user account prior to conducting the search, the retail server 112 collects the information regarding the residence of the user and generates the webpage 200 to include physical stores substantially close to the user's residence.

In some implementations, the help/FAQ information tile 262b includes a help/FAQ topic 272a, a help/FAQ rating 272b, a help/FAQ summary 272c, and a see all control 272d. The help/FAQ rating bar 272b substantially functions similarly as the rating bar 246h described above. The help/FAQ summary 272c provides a summary of the help/FAQ topic 272a. The user is able to optionally select control 272d to view all the available topics.

In some implementations, the webpage 200 represents a search result webpage with a number of search controls. The search controls can include selectable options for reviewing products and/or articles in the search result webpage. For example, a first search control may be operable to forward filtering criteria, such as keywords, categories, or other narrowing criteria to filter out unrelated search results from a larger database of search results. The client device 120 receives filtered search results and displays said results to a user within the search result webpage. Another search control can additionally be provided to further filter search results for the user.

Users can select any number of search controls to filter webpage content and receive a revised search result webpage. For example, a user can select one or more search controls to view a revised search result page containing a revised central region and a revised horizontal region. In particular, the central region includes an array of customizable merchandizing tiles and product tiles. The horizontal region is positioned beneath the merchandizing tiles and generally includes two or more sub-regions including an FAQ subsection, a buying guide subsection, a publications subsection, and a stores subsection. In some implementations, the stores subsection is linked to the physical store module 114 for providing information about bricks-and-mortar stores.

Figure 3:
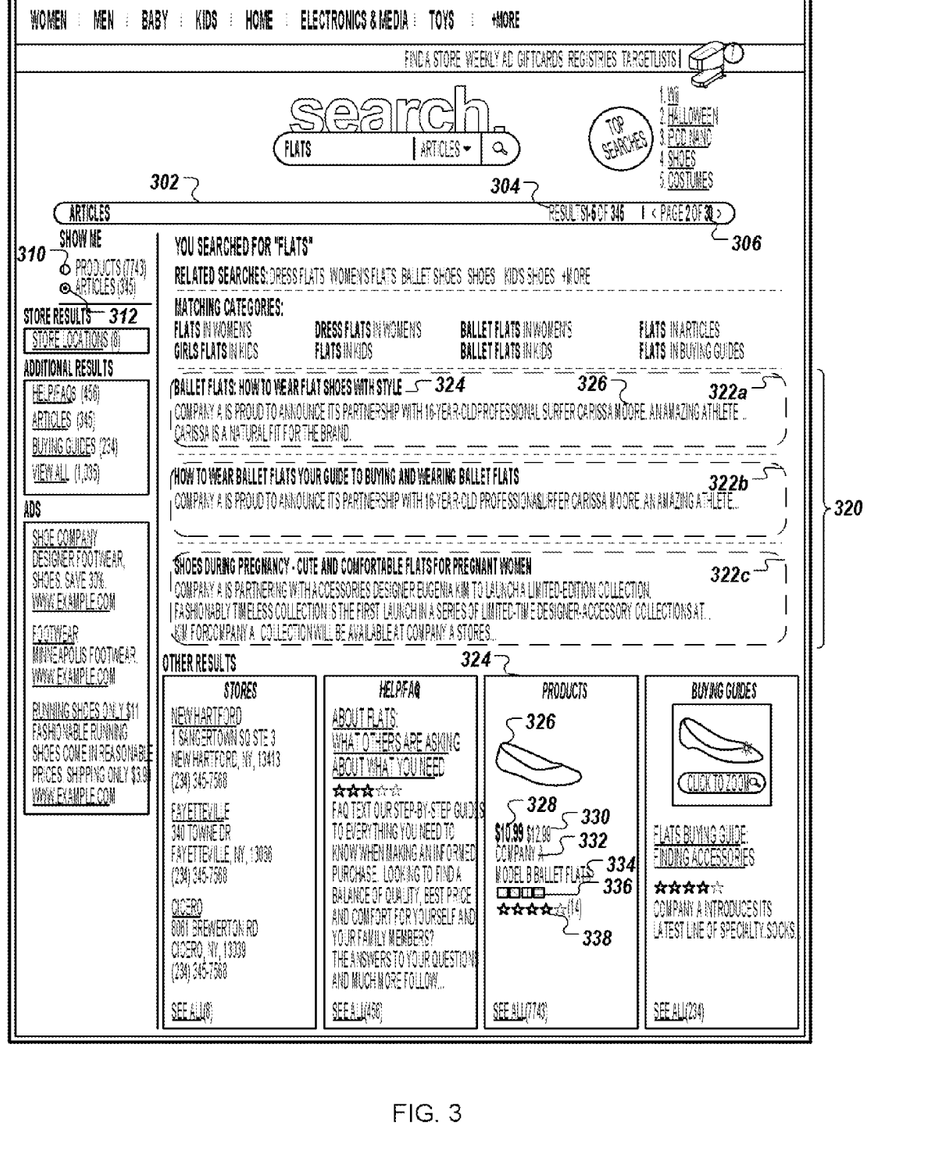
FIG. 3 is another example screenshot of a webpage in a search portal.

FIG. 3 is another example screenshot of a webpage 300 in a search portal 102. The webpage 300 includes a quick summary bar 302. In some implementations, the quick summary bar 302 includes a number of results 304 and a number of pages 306 displaying the results. The number of results 304 displays the number of articles in the retail system 104 that match the search input. The number of pages 306 indicates the number of pages available for the user to browse through the available articles.

The webpage 300 includes a first control 310 and a second control 312. In some implementations, the user accesses the webpage 300 by selecting the second control 312. In some implementations, the user is able to toggle between the webpage 200, primarily for showing product results, and the webpage 300, primarily for showing article results, by selecting the first and second controls 310, 312, respectively.

A central region 320 of the webpage 300 includes a number of articles 322a-c. The article 322a includes a title 324 and an abstract 326. The abstract summarizes the content of the article 322a. A product information tile 324 is displayed below the articles 322a-c. In some implementations, the product information tile 324 includes a product image 326, a current price 328, a previous price 330, a company name 332, a product name 334, a style indicator 336, a rating bar 338, and a see all control 340.

Similar to webpage 200, the webpage 300 provides tiles having links for directing the user to other resources such as store information, HELP/FAQ data, product data, and buying guide data. In addition, related search information and categorical data is also displayed for user selection.

Figure 4:
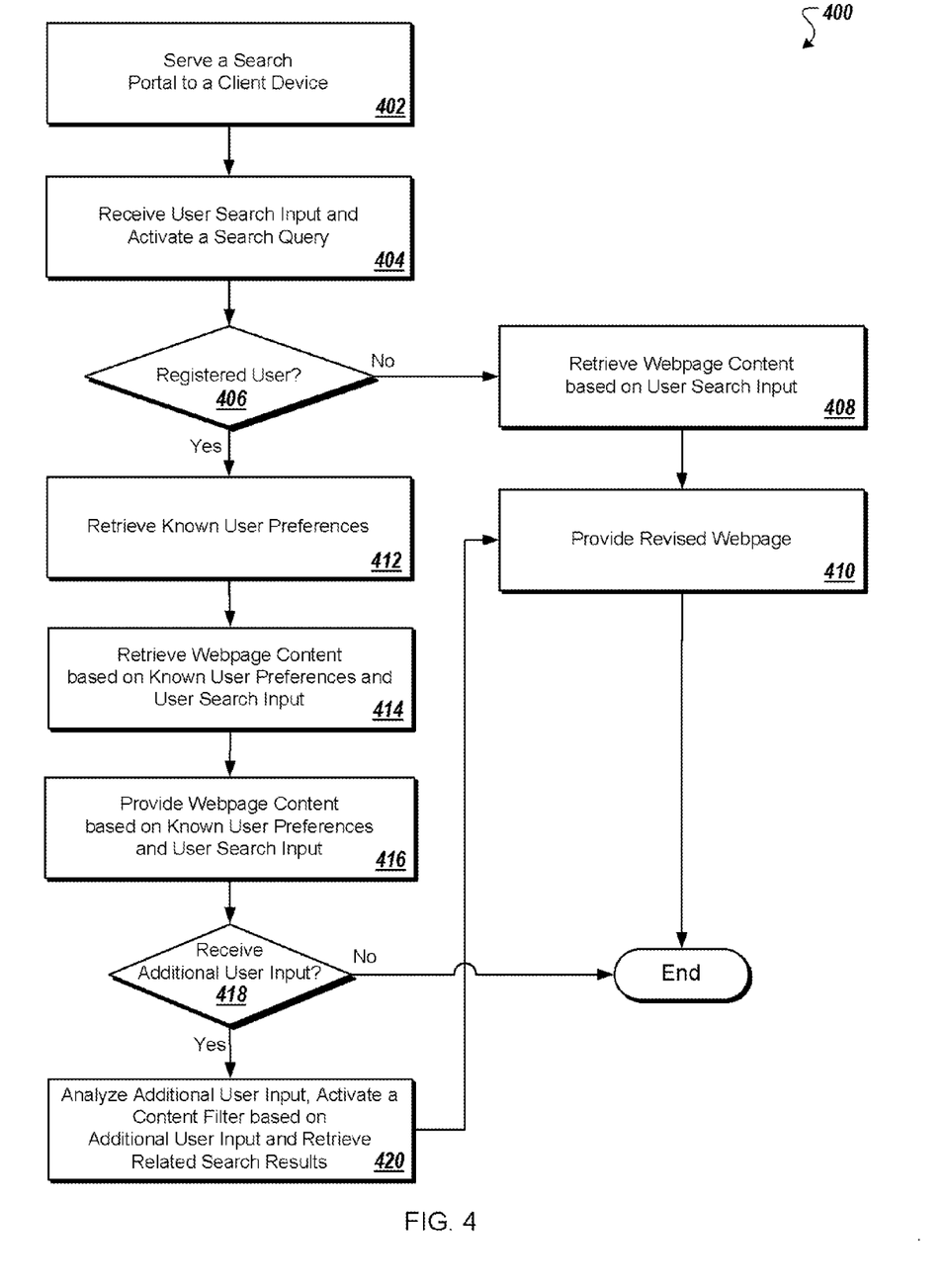
FIG. 4 is a flow diagram of an example process for serving a search portal.

FIG. 4 is a flow diagram of an example process 400 for serving the search portal 102. The process 400 is used in an environment, such as environment 100, to provide a user with search results pertaining to a product or service. The search results are generally retrieved from one or more repositories. In some implementations, the user inputs into the client device 120 a request for a blank webpage in the search portal 102 by entering a URL address associated with the blank webpage. In other implementations, the user requests a webpage in the search portal 102 by selecting a hyperlink designated to a particular webpage from a different webpage. In yet another implementation, a script may automatically send the request on behalf of the user.

The client device 120 sends a request for a webpage to the web server 108 through the network 122. The web server 108 obtains a blank webpage from the retail system 104, and serves (402) the blank webpage as a search portal to the client device 120. The user inputs a search query, such as search input 206g, into the search input box 206e.

Upon the user entering the search string, the web server receives (404) the first user input and activates a search query. In particular, the web server 108 receives the search string and sends the search string to the search engine 106. The search engine 106 matches the search string to the products existing in the product data repository 116 and/or the physical store repository 118. In some implementations, the search engine 106 searches for products and related data outside of the retail system 104. For example, the search engine 106 can access and provide vendor repository data, online customer review data, text articles, or other information to enhance a user experience.

At some point during process 400, the user may login to a user account while using the search portal 102. If the user has a user account and provides recognized login credentials, the process 400 provides more personalized search results based on the user's previously configured account preferences. For example, the process 400 can skew search results toward products for women if the user is identified as a registered female user. Similarly, if the user provided preference data for search page layout, the search portal 102 may customize a particle search page and any corresponding results to the user's preferences.

The web server 108 determines (406) whether the user requesting a search query is a registered user. If the web server 108 determines the user is not a registered user, the web server 108 retrieves webpage content based on the received user search input. That is, the server 108 simply uses the user entered search query to find appropriate search results. Upon retrieving the webpage content, the server 108 provides (410) a revised search webpage to the user (e.g., on the client device 120).

If, however, the web server 108 determines the user is indeed a registered user, the server 108 retrieves (412) known user preferences and retrieves (414) webpage content based on the known user preferences and the user search input. The web server 108 provides (416) the retrieved webpage content. Example webpage content is shown in FIGS. 2 and 3.

The web server 108 can provide updated, revised, or otherwise manipulated webpage content after a user's initial search query. For example, the web server 108 can receive further user input, advertising content, or other webpage update and provide a modified version of the webpage. In one example, the web server 108 determines (418) whether additional user input has been received. Additional user input can, for example, include user selection of a link on the webpage, added keyword content, advertisement selection, etc.

If the web server 108 detects additional user input, server 108 analyzes (420) the additional user input, activates a content filter based on the additional user input and retrieves related search results. The analysis includes determining what type of information the user inputted and which particular search results would pertain to the user's input. For example, the server 108 can determine that several categories of products, services, and/or articles are related to the user input and can populate a portion of the search webpage with such categorical information. Upon completing the analysis for applying the content filter above, the web server 108 provides (410) a revised webpage. The user can make further selections from the revised webpage.

If the web server 108 determines that additional user input has not been received, the web server 108 provides no change to the product, service, and article information until receiving further user interaction.

Figure 5:
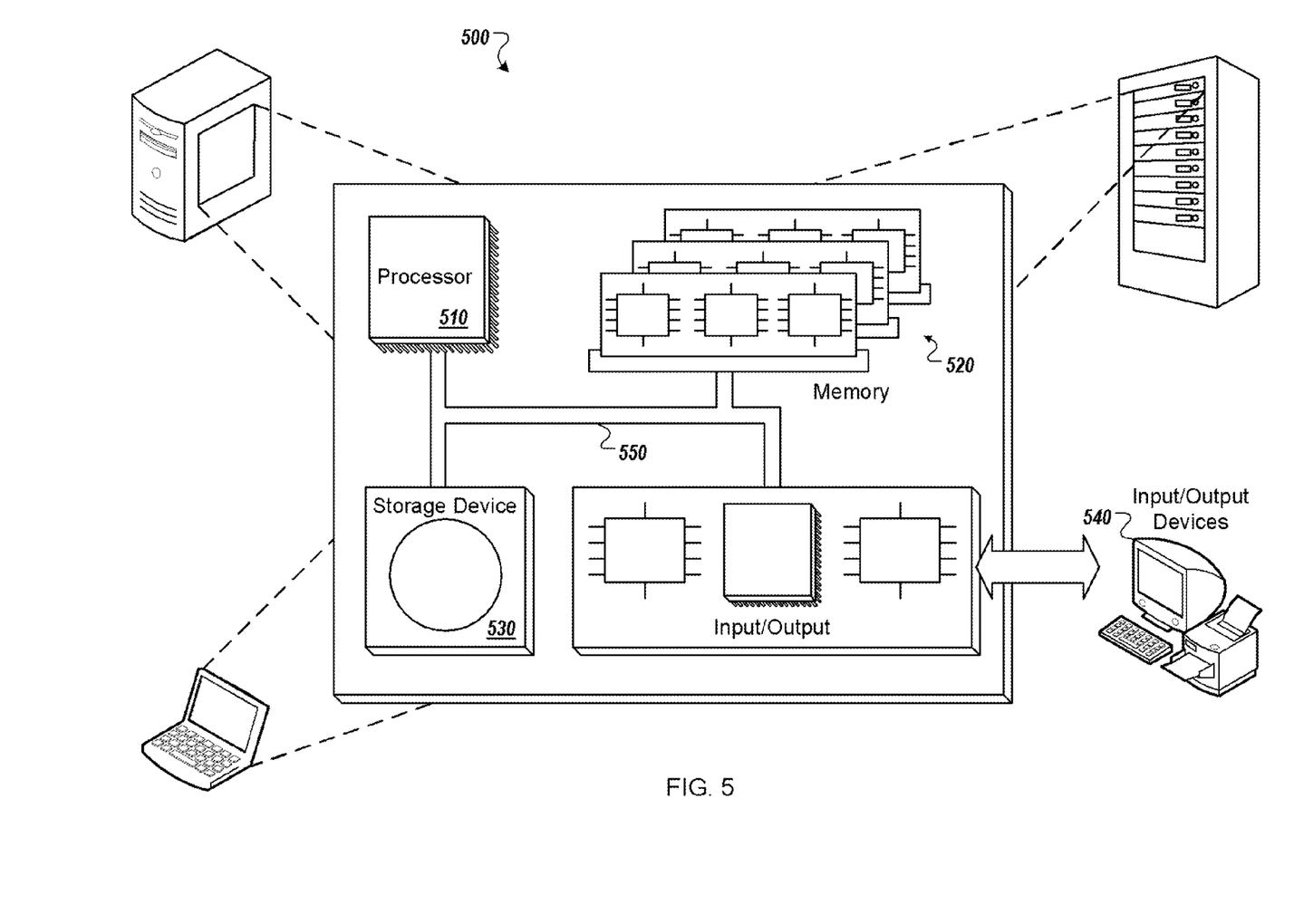
FIG. 5 is a block diagram of a computing system optionally used in connection with computer-implemented methods described in this document.

FIG. 5 is a schematic diagram of a generic computer system 500. The system 500 is optionally used for the operations described in association with any of the computer-implemented methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 is optionally a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A method of serving a search portal, the method comprising:
   serving, from a retail server to a client computing device, a search portal of a retail enterprise, the search portal including
   a central region having an array of customizable merchandising tiles, said merchandizing tiles being customizable by the retail enterprise serving a webpage to display one of an advertisement and a product available for purchase via the webpage;
   at least one informational region comprising two or more sub-regions selected from the group consisting of an FAQ subsection, a buying guide subsection, a publications subsection, and a stores subsection, the stores subsection being linked to a portal providing information about physical retail locations of the retail enterprise;
   receiving, from a client computing device, a first user search input activating a search query;
   in response to the first user search input, generating, using at least one computer, a first webpage content for the search portal based on the first user search input;
   concurrently populating the central region with a first portion of the first webpage content and the at least one informational region with a second portion of the first webpage content without further action by the first user other than the first user search input activating the search query, wherein the first portion of the first webpage content and the second portion of the first webpage content are based on the first user search input; and,
   configuring at least one computer to dynamically populate the central region and the at least one informational region with different content based on a search input different from the first user search input without further action by a user other than input of a different search activating a different search query.

2. The method of claim 1, wherein the first user search input is a search for one or more products in a first product category and the first portion of the first webpage content includes merchandizing tiles providing sales information relating to one or more products within the first product category and the second portion of the first webpage content includes information for at least one buying guide and at least one publication relating to at least one product within the first product category.

3. The method of claim 2, further comprising:
   receiving, from a client computing device, a second user search input activating a search query, the second user search input is a search for one or more products within a second product category different from the first product category;
   in response to the second user search input, generating, using at least one computer, a second webpage content for the search portal based on the second user search input;
   concurrently populating, based on the second user search input, the central region with a first portion of the second webpage content and the at least one informational region with a second portion of the second webpage content without further action by the second user other than the second user search input activating a search query, wherein the first portion of the second webpage content and the second portion of the second webpage content are particular to the second user search input.

4. The method of claim 3, further comprising:
   concurrently populating, based on the second user search input, the central region with merchandizing tiles providing sales information relating to one or more products within the second product category and the second portion with at least one buying guide and at least one publication particular to at least one product within the second product category.

5. The method of claim 1 further comprising:
   subsequent to receiving the first user search input, receiving a filtering search input activating a content filter;
   associating the content filter with at least one displayed product in the central region, wherein the content filter revises the webpage content to display product review information pertaining to at least one displayed product; and
   providing revised webpage content in the at least one informational region, wherein the revised webpage content is selected for page population based on the filtering search input.

6. The method of claim 1, further comprising retrieving content for the two or more sub-regions from multiple databases.

7. The method of claim 1, wherein at least two of the following generally horizontal regions are positioned proximate to and below a search input region of the search portal: a related search region, a suggested search target region, and a sort controls region.

8. The method of claim 7, wherein the array of customizable merchandizing tiles are displayed beneath three generally horizontal regions including the related search region, the suggested search target region, and the sort controls region.

9. A computer-implemented method for providing a graphical user interface (GUI), the method comprising:
   displaying a GUI including a navigation area, the navigation area including a central region having an array of customizable merchandizing tiles, said merchandizing tiles being customizable by a retail enterprise serving said GUI to display one of an advertisement and a product available for purchase via the GUI; and
   a generally horizontal region positioned beneath the merchandizing tiles and comprising two or more sub-regions selected from the group consisting of an FAQ subsection, a buying guide subsection, a publications subsection, and a stores subsection, the stores subsection being linked to a portal providing information about physical retail locations;
   receiving, from a client computing device, a first user search input activating a search query;
   in response to the first user search input, generating, using at least one computer, a first webpage content for the GUI based on the first user search input;
   concurrently populating the central region with a first portion of the first webpage content and the generally horizontal region with a second portion of the first webpage content without further action by the first user other than the first user search input activating the search query, wherein the first portion of the first webpage content and the second portion of the first webpage content are based on the first user search input; and,
   configuring at least one computer to dynamically populate the central region and the generally horizontal region with different content upon receiving from a client computing device a search input which is different from the first user search input without further action by a user other than a different user search input activating a different search query.

10. The method of claim 9, wherein the first user search input is a search for one or more products in a first product category and the first portion of the first webpage content includes merchandizing tiles providing sales information relating to one or more products within the first product category and the second portion of the first webpage content includes information for at least one buying guide and at least one publication relating to at least one product within the first product category.

11. The method of claim 10, further comprising:
   receiving, from a client computing device, a second user search input activating a search query, the second user search input is a search for one or more products within a second product category different from the first product category;
   in response to the second user search input, generating, using at least one computer, a second webpage content for the GUI based on the second user search input;
   concurrently populating the central region with a first portion of the second webpage content and the at least one informational region with a second portion of the second webpage content without further action by the second user other than the second user search input activating a search query, wherein the first portion of the second webpage content and the second portion of the second webpage content are based on the second user search input.

12. The method of claim 11, wherein the second webpage content includes merchandizing tiles providing sales information relating to one or more products within the second product category and the second portion of the second webpage content includes information for at least one buying guide and at least one publication particular to at least one product within the second product category.

13. The method of claim 9 wherein the at least one information section includes the FAQ subsection, the buying guide subsection, the publications subsection, and the stores subsection.

14. The method of claim 9, further comprising retrieving the GUI content for the FAQ subsection, the buying guide subsection, the publications subsection, or the stores subsection from different databases.

15. The method of claim 9, wherein at least two of the following generally horizontal sections are positioned proximate to and below a search input section of the GUI: a related search section, a suggested search target section, and a sort controls section.

16. The method of claim 15, wherein the array of customizable merchandizing tiles are displayed beneath three generally horizontal sections including the related search section, the suggested search target section, and the sort controls section.

17. A computer-implemented method of providing a graphical user interface (GUI) on at least one electronic display over a communication network, the method comprising:
   generating, with at least one computer, a GUI;
   displaying the GUI, using at least one computer, on at least one electronic display, the GUI including a central region having a plurality of customizable tiles, each of the plurality of customizable tiles being customizable by a retail enterprise serving a webpage to display in each of the plurality of customizable tiles a graphic image of a product available for purchase via the webpage, at least two of the plurality of customizable tiles are positioned side-by-side, the GUI further including a generally horizontal region positioned beneath the plurality of customizable tiles and comprising a help sub-region and a stores sub-region, the stores sub-region having information on physical retail locations, the GUI further including an ad control region having a list of advertisements, the ad control region being offset horizontally from the plurality of customizable tiles, the help sub-region and the stores sub-region, the GUI further including a search control region having a plurality of options a user can select from to narrow results of a search displayed in the central region, the search control region being substantially vertically aligned with the ad control region and being offset horizontally from the plurality of customizable tiles, the help sub-region and the stores sub-region;
   receiving, from a client computing device, a first user search input activating a search query;
   in response to the first user search input, generating, using at least one computer, a first webpage content for the GUI based on the first user search input;
   concurrently populating the central region with a first portion of the first webpage content and the ad control region with a second portion of the first webpage content without further action by the first user other than the first user search input activating the search query, wherein the first portion of the first webpage content and the second portion of the first webpage content are based on the first user search input; and, configuring at least one computer to dynamically populate the central region and the ad control region with different content upon receiving from a client computing device a search input which is different from the first user search input without further action by a user other than a different user search input activating a different search query.

18. The method of claim 17, wherein the GUI further comprises a related search list based on the first user search input, the related search list includes a list of keywords that are related to the first user search input.

19. The method of claim 18, wherein the GUI further comprises a product category control configured to allow a first user to narrow a first search result displayed in the central region based on the first user search input by selecting one of a plurality of product categories of the product category control.

20. The method of claim 19, wherein the GUI further comprises a first control and a second control simultaneously displayed on a portion of a webpage, the first control is configured such that when activated by the first user products matching the first user search input are displayed in the central region, the second control is configured such that when activated by the first user at least portions of articles matching the first user search input are displayed in the central region.

* * * * *